Jan. 21, 1947.                M. H. MAY                2,414,756
                       CONDITION RESPONSIVE DEVICE
                          Filed May 7, 1943
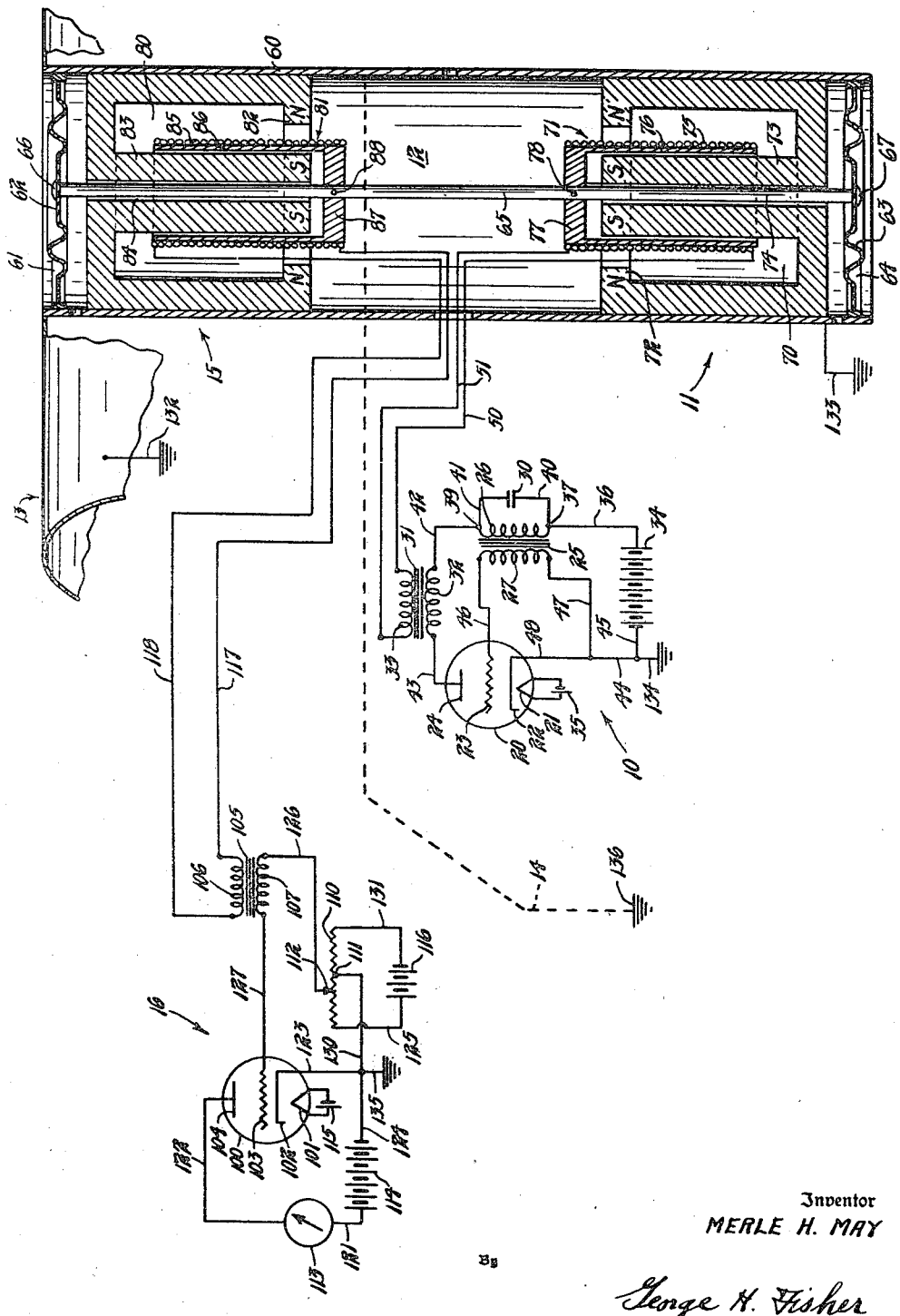
Inventor
MERLE H. MAY
George H. Fisher
Attorney Patented Jan. 21, 1947

2,414,756

UNITED STATES PATENT OFFICE 2,414,756

CONDITION RESPONSIVE DEVICE

Merle H. May, Minneapolis, Minn., assignor to Minneapolis-Honeywell Regulator Company, Minneapolis, Minn., a corporation of Delaware Application May 7, 1943, Serial No. 486,103

7 Claims. (Cl. 177—311)

This invention relates to the field of measuring and control devices, and comprises means for responding to any condition capable of presenting as a parameter attenuation of a mechanical signal. The invention is particularly adapted for use as an ice indicator for aircraft, and will be principally described in this connection, but it may also be embodied in test instruments for viscosity of fluids and for other conditions such as temperature which may be measured in terms of viscosity, for density of fluids, elasticity and resiliency of solids and pseudo-solids, the level of fluid in tanks, depths of bodies under the surface of fluids and static and dynamic pressure heads. Engine oil and cooling fluid temperatures may be checked with suitable embodiments of my invention, as can charge condition of batteries, end points in certain cooking and evaporating processes and chemical reactions, etc. It is an object of my invention to provide a system responsive to any condition capable of presenting as a parameter attenuation of a mechanical signal.

It is a further object of my invention to provide a new and improved condition responsive means.

It is a further object of my invention to provide a new and improved ice indicating system.

It is a further object of my invention to provide a condition responsive device including a vibratile element, means imparting energy of normal vibration thereto, and indicator means for responding to the vibration of the element, wherein the element is exposed to a condition having an attenuating or other perceptible effect on the normal vibration of the element.

It is a further object of my invention to provide a new and improved sensing element for an ice indicator system.

It is a still further object of my invention to provide a sensing element for an ice indicator system including a vibratile element, means imparting energy of normal vibration thereto, and indicating means for responding to the vibration of the element, wherein the element is exposed to accretion of ice having attenuating or other perceptible effect on the normal vibration of the element.

Other objects and advantages of my invention will become apparent upon a study of the specification and the subjoined claims, and of the drawing which is appended hereto and which is to be considered a part hereof, the single figure of which shows in a schematic and partly sectional manner the construction and arrangement of certain elements making up an embodiment of my invention.

In general terms, the figure shows an electronic oscillator unit 10 electrically associated with a driving element 11 of a sensing device 12 rigidly mounted in an airfoil 13. Separated from members 10 and 11 by a suitable electrostatic and electromagnetic shield 14 are a pick-up element 15 and an amplifier 16. The functional relationship between these various members will be presently set forth.

Oscillator 10 comprises: a vacuum tube 20 having a filament 21, a cathode 22, a grid 23 and a plate 24; an oscillation transformer 25 including a primary winding 26 and a secondary 27; a condenser 30; a coupling transformer 31 including a primary winding 32 and a secondary winding 33; a source of plate current 34 and a source of filament current 35. Condenser 30 is connected in parallel with the primary 26 of transformer 25 to form a parallel resonant circuit which stabilizes the frequency of oscillation of the oscillator at an arbitrary value, as is well known in the art.

The plate circuit of the oscillator may be traced as follows: Positive terminal of plate supply 34, conductor 36, terminal 37 of the resonant circuit—comprising primary 26, conductor 40, condenser 30 and conductor 41—the resonant circuit, terminal 39 of the resonant circuit, conductor 42, primary 32 of transformer 31, conductor 43, plate 24 of tube 20, through the tube to cathode 22, conductors 48, 44 and 45 and back to the negative terminal of plate supply 34.

The grid circuit of the oscillator may be traced as follows: grid 23, conductor 46, secondary 27 of transformer 25, conductors 47 and 48, cathode 22 of tube 20, and back to grid 23. It will be seen that by the action of oscillation transformer 25, a signal varying with the plate current of tube 20 is impressed on grid 23, thereby causing oscillation of the tube circuit at a frequency determined by the electrical characteristics of elements 26 and 30. Secondary winding 33 of transformer 31 impresses the output of the oscillator upon conductors 50 and 51.

Sensing device 12 may conveniently comprise a housing 60 open at its end and secured in any convenient fashion in airfoil 13. Mounted at one end of the housing by means of a mounting ring 61 is a diaphragm 62 arranged for exposure to ice accretion. A similar diaphragm 63 is mounted by means of a similar ring 64 at the other end of the housing. A member 65 is rigidly connected as at 66 and 67 to the centers of diaphragms 62 and 63, respectively. It will thus be seen that member 65 is arranged for vibration with diaphragm 62 and that the diaphragm 63 acts as an outboard bearing for member 65. Members 62, 63 and 65 are thus arranged for unitary vibration with respect to housing 60.

Mounted in any convenient fashion within housing 60 is driving element 11, which comprises a magnetic member 70 and an electromagnetic member 71. It will be understood that member 70 can also be an electromagnetic member having its magnetic energy provided by a suitable winding energized from a source of electricity, but for the sake of simplicity I have shown it as comprising a permanent magnet. The member may conveniently take the form of a cup having an internal flange 72 as its open end and a central pillar 73, the latter having an axial bore 74 to provide free passage for member 65. Member 70 is magnetized so that the flange 72 is one polarity and the end of pillar 73 is of the opposite polarity: in this figure I have shown them as being north and south poles, respectively.

Member 71 comprises a coil of wire 75 which may be form-retaining or which may be mounted on a form 76. Coil 75 is arranged to be coaxial with pillar 73 and member 65 for free axial movement in the annular space between pillar 73 and flange 72 of magnet member 70, being unitarily mounted on member 65 by means of a disk 77, which may be fastened to member 65 by any convenient means such as a pin 78. Output conductors 50 and 51 of oscillator 13 are connected to the ends of coil 75.

Also mounted in any convenient fashion within housing 60 is pick-up element 15 which comprises a magnetic member 80 and an electromagnetic member 81. It will be understood that member 80 can also be an electromagnetic member having its magnetic energy provided by a suitable winding energized from a source of electricity, if desired. I have shown this member as a permanent magnet having the form of a cup with an internal flange 82 and a central pillar 83, the latter having an axial bore 84 to provide free passage for member 65. Member 80 is magnetized so that the flange 82 is of one polarity and the end of pillar 83 is of the opposite polarity: in the figure I have shown them as being north and south poles, respectively.

Member 81 comprises a coil of wire 85 which may be form-retaining or may be mounted on a form 86. Coil 85 is arranged coaxial with pillar 83 and member 65 for free axial movement in the annular space between pillar 83 and flange 82 of magnet 80, being unitarily mounted on member 65 by means of a disk 87 which may be fastened to member 65 by any convenient means such as a pin 88.

It will be understood that the mechanical unit comprising diaphragms 62 and 63, member 65, disks 77 and 87, coils 75 and 85, and forms 86 and 76 has a natural period of mechanical vibration along the axis of member 65. It will also be understood by properly selecting the reactances of primary 26 of transformer 25 and the capacitance of condenser 30, the electrical frequency of the oscillator 10 may be made the same as the natural mechanical frequency of sensing element 12.

Amplifier 16 comprises: a vacuum tube 100 having a filament 101, a cathode 102, a grid 103, and a plate 104; an input transformer 105 having a primary 106 and a secondary 107; a bias adjustment comprising a potentiometer 110 having a fixed center tap 111 and a sliding contact 112; an indicating device comprising a direct current meter 113; a source of plate current 114, a source of filament current 115, and a source of biasing current 116 which is connected across the terminals of potentiometer 110 as by conductors 125 and 131. Primary 106 of transformer 105 is connected as by conductors 117 and 118 to the ends of coil 85.

The plate circuit of the amplifier may be traced as follows: the positive terminal of plate supply 114, conductor 121, indicator 113, conductor 122, plate 104 of tube 100, through the tube to cathode 102, conductors 123 and 124 and back to the negative terminal of plate supply 114.

The grid circuit of the amplifier may be traced as follows: grid 103 of tube 100, conductor 127, secondary 107 of transformer 105, conductor 126, movable contact 112 of potentiometer 110, a portion of the potentiometer, conductor 130, conductor 123 and back to cathode 102 of tube 100.

It will be obvious that any alternating potential appearing on conductors 117 and 118 will be impressed by transformer 105 on the grid circuit of tube 100, modulating the plate current accordingly.

The various members comprising invention may be grounded as indicated at 132, 133, 134, 135, and 136, if desired.

Operation

Considering the operation of my invention, I shall first consider the case when no ice is formed on diaphragm 62. It is assumed that amplifier 16 and oscillator 10 are both in operation, and oscillator 10 is passing through coil 75 an alternating voltage of a frequency which is substantially the same as the mechanical frequency of member 71 and elements fastened thereto. According to well known electrical principles, when this alternating electrical potential is applied to coil 75 located in the field of magnetic element 70, continuous axial mechanical vibration of the assembly is produced, and since the oscillator is constructed to be in a stable electrical condition, energy is provided uniformly to coil 75 and uniform mechanical vibration of the assembly takes place.

As is also well known, mechanical vibration of coil 85 cutting the field of magnet 80 causes an alternating electrical potential having the same frequency as the frequency of the mechanical vibration to be impressed across the primary 106 of transformer 105. As I have pointed out, the transformer acts to modulate the direct current flowing in the plate circuit at the same frequency. Potentiometer 110 is adjusted to such a position that a grid bias of the desired magnitude is maintained on the grid independent of any incoming signal. It will be seen that this bias may be either positive or negative as may be desired. Under the conditions I have outlined above, potentiometer 110 is adjusted to give a grid bias which will permit the passing of sufficient plate current to produce a maximum reading on meter 113. Due to the detector action of tube 100, under the influence of appropriate grid bias, the current passing through meter 113 is not an alternating current, but a pulsating direct current, and since the selected frequency has been chosen to be well above that to the separate pulses of which the meter is capable of giving individual response, the meter gives an indication which is influenced jointly by the normal plate current of the tube and by an effect proportional to the amplitude of the pulsating current. The latter is itself proportional to the amplitude of the signal impressed upon transformer 105. It will thus be clear that during normal operation of the instrument, a maximum signal is given by the indicator, and any failure of the circuit will immediately be evident to the operator by an indication of zero on the meter.

Now let it be assumed that ice of appreciable thickness is formed upon the airfoil surface and diaphragm 62. One effect of this ice accretion will be to damp the mechanical vibration of sensing element 12, that is to decrease its amplitude, a portion of the energy of vibration which is uniformly supplied by oscillator 10 being absorbed by the layer of ice. Then the amplitude of the signal being impressed upon primary 106 of transformer 105 will be reduced, and this reduced signal will be transmitted through the tube and appear as a small indication on meter 113. Additional accretion of ice on the diaphragm produces additional reduction in signal amplitude and therefore in indication of the meter, until at some point the mechanical vibration of member 65 and its assembly may be completely stopped. In this case, the meter indicates its minimum reading which is the no-signal plate current of the tube as influenced by the setting of the potentiometer 110.

Since various changes and substitutions within the bounds of my invention will become apparent to those skilled in the art, upon a study of the present specification, I do not wish to be limited by details of structure herein set forth for purposes of illustration, but only by the subjoined claims.

I claim as my invention:

1. A sensing element for an ice indicator comprising a first diaphragm adapted to be exposed to ice accretion, a second diaphragm, a member joining said diaphragms at points spaced from their edges to form an assembly, first magnetic means carried in part by said member for uniformly supplying energy of normal vibration to said assembly, accretion of ice on said first diaphragm altering a characteristic of said vibration, and second magnetic means carried in part by said member and electrically responsive to said altered vibration.

2. A sensing unit for an ice indicator comprising a first diaphragm adapted to be exposed to ice accretion, a second diaphragm, a member joining said diaphragms at points spaced from their edges to form an assembly, first magnetic means carried in part by said member by which said assembly is vibrated in a predetermined manner when cyclical electrical energy is applied thereto in the absence of accretion of ice on said first diaphragm and in a different manner upon accretion of ice thereon, and second magnetic means carried in part by said member for generating electrical energy commensurate with the vibration of said first diaphragm.

3. In a device of the class described, a housing, a pair of diaphragms mounted spacedly in said housing, one of said diaphragms being adapted to be exposed to ice accretion, a plurality of homopolar magnets fixed in said housing with respect to said diaphragms, a member traversing the central poles of said magnets and fastened to said diaphragms for unitary movement therewith, a plurality of coils mounted on said member for unitary motion therewith, one of said coils being adapted for energization from a source of alternating current, whereby to cooperate with one of said magnets to effect vibration of said member and said diaphragm, accretion of ice on said diaphragm affecting a characteristic of said vibration, one of said coils cooperating with one of said magnets to comprise a device electrically responsive to change in said characteristic of said vibration, and indicating means connected to said responsive device to indicate the magnitude of said change.

4. A sensing unit for an ice indicator comprising, in combination, first and second spaced diaphragms, means connecting said diaphragms for vibration as a unitary structure, means for mounting said structure to expose only said first diaphragm to ice accretion, and magnetic means for supplying said structure with energy of vibration having a predetermined characteristic which is variably affected by variable accretion of ice on said first diaphragm, and whereby electrical response is given to said vibration in accordance with said characteristic thereof.

5. A sensing unit for an ice indicator comprising first and second spaced diaphragms, means connecting said diaphragms for vibration as a unitary structure, means for mounting said structure to expose only said first diaphragm to ice accretion, and means whereby said structure is supplied with energy of vibration having a predetermined characteristic which is variably affected by variable accretion of ice on said first diaphragm, and whereby response is given to said vibration in accordance with said characteristic thereof.

6. A sensing unit for an ice indicator comprising, in combination, first and second spaced vibratile members having stationary portions and vibratile portions, means for independently supporting the stationary portions of said members to expose only said first member to ice accretion, a connecting member supported by said vibratile members and connecting the vibratile portions of said members for vibration therewith as a unitary structure, and magnetic means, carried in part by said connecting member and in part in said mounting means, for supplying said structure with energy of vibration having a predetermined characteristic which is variably affected by variable accretion of ice on said first member, and for giving electrical response to said vibration in accordance with said characteristic thereof.

7. A sensing unit for an ice indicator comprising, in combination, first and second spaced vibratile members having stationary portions and vibratile portions, means for independently supporting the stationary portions of said vibratile members to expose only said first member to ice accretion, a connecting member supported by said vibratile members and connecting the vibratile portions of said members for vibration therewith as a unitary structure, and means carried at least in part by said connecting member whereby said structure is supplied with energy of vibration having a predetermined characteristic which is variably affected by variable accretion of ice on said first member, and whereby response is given to said vibration in accordance with said characteristic thereof.

MERLE H. MAY.